(12) United States Patent
Crain (10) Patent No.: US 8,747,141 B2
(45) Date of Patent: *Jun. 10, 2014

(54) DELATCHING CONNECTOR INCLUDING EXTENSION MEMBER

(71) Applicant: CommScope, Inc. of North Carolina, Hickory, NC (US)

(72) Inventor: Charles Thomas Crain, Melissa, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,910

(22) Filed: Oct. 14, 2013

(65) Prior Publication Data

US 2014/0038448 A1    Feb. 6, 2014

Related U.S. Application Data

(63) Continuation-in-part of application No. 13/447,338, filed on Apr. 16, 2012, now Pat. No. 8,556,645.

(60) Provisional application No. 61/597,294, filed on Feb. 10, 2012, provisional application No. 61/589,497, filed on Jan. 23, 2012.

(51) Int. Cl.
*H01R 13/625* (2006.01)

(52) U.S. Cl.
USPC .......................................... 439/352; 439/258

(58) Field of Classification Search
USPC ......... 439/352, 258, 491, 447, 676, 488, 344, 439/901, 923
See application file for complete search history.

(56) References Cited

U.S. PATENT DOCUMENTS

| | | | |
|---|---|---|---|
| 5,090,096 A | 2/1992 | Terada et al. |
| 5,233,674 A | 8/1993 | Vladic |
| 5,308,260 A | 5/1994 | Johnston et al. |
| 5,358,430 A | 10/1994 | Bonvallat et al. |
| 5,638,474 A | 6/1997 | Lampert |
| 5,647,765 A | 7/1997 | Haas et al. |
| 6,250,817 B1 | 6/2001 | Lampert |
| 6,254,418 B1 | 7/2001 | Tharp et al. |

(Continued)

FOREIGN PATENT DOCUMENTS

| | | |
|---|---|---|
| JP | 2001-141961 A | 5/2001 |
| JP | 2011-008209 A | 1/2011 |
| WO | WO 2011-100633 A1 | 8/2011 |

*Primary Examiner* — Neil Abrams
*Assistant Examiner* — Phuongchi T Nguyen
(74) *Attorney, Agent, or Firm* — Muncy, Geissler, Olds & Lowe, P.C.

(57) ABSTRACT

A connector includes a body configured to latchingly connect to a complementary connector element in a latching direction and an arm projecting from the body at an angle to the axis. The arm is configured to shift from a first position with its distal end a first distance from the axis to a second position with its distal end a second distance from the axis, and the body is removable from the complementary connector element when the arm is in the second position. The connector includes a force redirection element connected to the body and an extension member in contact with the force redirection element. The force redirection element is configured such that when a force is applied to the extension member in a direction opposite the latching direction, the arm is shifted from the first position toward the second position.

20 Claims, 6 Drawing Sheets

(56) References Cited

U.S. PATENT DOCUMENTS

| | | |
|---|---|---|
| 6,357,934 B1 | 3/2002 | Driscoll |
| 6,398,569 B1 | 6/2002 | Boyd et al. |
| 6,544,076 B2 | 4/2003 | Pocrass |
| 6,595,805 B2 | 7/2003 | Pocrass |
| 6,612,856 B1 | 9/2003 | McCormack |
| 6,746,264 B1 | 6/2004 | Branch et al. |
| 6,764,333 B2 | 7/2004 | Pocrass |
| 7,314,384 B2 | 1/2008 | Togami et al. |
| 7,473,124 B1 | 1/2009 | Briant et al. |
| 7,534,128 B2 | 5/2009 | Caveney et al. |
| 7,562,116 B2 * | 7/2009 | Barsness ................. 709/204 |
| 7,588,373 B1 | 9/2009 | Sato |
| 7,651,361 B2 | 1/2010 | Henry et al. |
| 8,235,745 B1 | 8/2012 | Armstrong et al. |
| 8,382,506 B2 | 2/2013 | Reed et al. |
| 8,425,247 B2 * | 4/2013 | Wojcik et al. ................. 439/352 |
| 2003/0064630 A1 | 4/2003 | Pocrass |
| 2004/0009699 A1 | 1/2004 | Pocrass |
| 2004/0247252 A1 * | 12/2004 | Ehrenreich et al. ............. 385/58 |
| 2005/0277335 A1 | 12/2005 | Gordon et al. |
| 2009/0275228 A1 * | 11/2009 | Henry et al. ................. 439/352 |
| 2010/0159742 A1 * | 6/2010 | Chen ......................... 439/540.1 |
| 2010/0304617 A1 | 12/2010 | Ma et al. |
| 2011/0045683 A1 | 2/2011 | Foung |
| 2011/0124217 A1 | 5/2011 | Foung |

\* cited by examiner

DELATCHING CONNECTOR INCLUDING EXTENSION MEMBER

CROSS REFERENCE TO RELATED APPLICATIONS

The present application is a continuation-in-part of U.S. Utility patent application Ser. No. 13/447,338, filed Apr. 16, 2012, now U.S. Pat. No. 8,556,645, which claims the benefit of U.S. Provisional Patent Application No. 61/597,294, filed Feb. 10, 2012, and the benefit of U.S. Provisional Patent Application No. 61/589,497, filed Jan. 23, 2012, the entire contents of the three applications being hereby incorporated by reference.

FIELD OF THE INVENTION

The present invention is directed toward a connector having a delatching mechanism that can be actuated by applying a force to an extension member connected to the delatching mechanism, and, more specifically, toward a connector having a delatching lever arm that can be moved in a first direction to delatch the connector by applying a force in a direction different than the first direction.

BACKGROUND OF THE INVENTION

RJ45, LC and similar latching connectors comprise a plug body that is insertable into an opening in a complementary connector structure which may be found in a wall jack, for an RJ45 connector, or in telecommunications, network, or computer equipment in the case of LC connectors. Such connectors generally include an arm projecting from the plug body that has a free end that can be depressed toward the plug body. Depressing the arm moves certain conventional latching structures to allow the plug body to be removed from the complementary connector. When the arm is not depressed, the latching structures hold the plug body in the opening.

When one plug is present in one opening, and when there is sufficient clearance around the opening, it is relatively simple to grasp the plug body and depress the arm toward the plug body by applying pressure to a free end of the arm and to the plug body on a side opposite the arm. However connectors may be arranged in a row in a closely spaced manner, and additional rows may be present above and/or below a given row. In such cases, it may be difficult to depress an arm against a connector body to remove a particular connector from an opening. In some cases, only one side of the connector can be reached and thus the connector body cannot be pinched as with a single telephone plug in a wall jack. In other cases, the connectors are spaced so closely, or so close to another structure, such as a dust cover or protective door, that it is difficult to depress only one tab or to be sure that the desired tab is being depressed.

It would therefore be desirable to provide a delatching connector that can be delatched even when it is mounted in close proximity to another connector or structure.

SUMMARY OF THE INVENTION

This problem and others are addressed by the present invention, a first aspect of which comprises a connector having a body configured to latchingly connect to a complementary connector element in a latching direction, the body including a first end for engaging the complementary connector element, a second end and a longitudinal axis. An arm projects from the body at an angle to the axis and has a connected end at the body and a distal end spaced from the body and is configured to shift from a first position with the distal end a first distance from the axis to a second position with the distal end a second distance from the axis. The second distance is less than the first distance, and the body can be removed from the complementary connector element when the arm is in the second position. The connector also includes a force redirection surface spaced from the arm distal end, and an extension member is connected to the arm and passes between the force redirection surface and the body and extends away from the latching end of the body.

Another aspect of the invention comprises a connector that includes a body configured to latchingly connect to a complementary connector element in a latching direction, the body including a first end for engaging the complementary connector element, a second end and a longitudinal axis. An arm projects from the body at an angle to the axis and has a connected end at the body and a distal end spaced from the body and is configured to shift from a first position with the distal end a first distance from the axis to a second position with the distal end a second distance from the axis, the second distance being less than the first distance. The body is removable from the complementary connector element when the arm is in the second position. The connector also includes a flap having a first end connected to the body and a free end overlying the arm distal end and an extension member connected to the flap and extending in a direction opposite the latching direction.

A further aspect of the invention comprises a connector having a body configured to latchingly connect to a complementary connector element in a latching direction, the body including a first end for engaging the complementary connector element, a second end and a longitudinal axis. An arm projects from the body at an angle to the axis, has a connected end at the body and a distal end spaced from the surface, and is configured to shift from a first position with the distal end a first distance from the axis to a second position with the distal end a second distance from the axis, the second distance being less than the first distance. The body is removable from the complementary connector element when the arm is in the second position. The connector also includes a force redirection element connected to the body at a fixed location between the first and second ends and an extension member in contact with the force redirection element. These elements are configured such that when a force is applied to the extension member in a direction opposite the latching direction, it is redirected by the force redirection element to shift the arm from the first position toward the second position.

Another aspect of the invention comprises a connector having body means for latchingly and releasably connecting to a complementary connector element, a first end for engaging the complementary connector element, a second end and a longitudinal axis. The connector also includes delatching means connected to the body for delatching the body from the complementary connector element, extension means connected to the delatching means for applying a force to the delatching means from a location spaced from the delatching means, and force redirection means for changing a direction of the force.

BRIEF DESCRIPTION OF THE DRAWINGS

These and other aspects and features of the present invention will be better understood after a reading of the following detailed description together with the attached drawings wherein.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
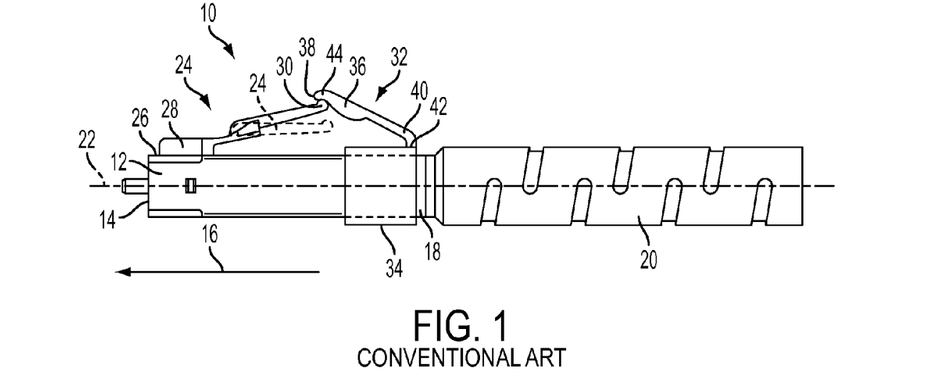
FIG. 1 is a side elevational view of a conventional LC connector having an antisnag flap.
Figure 2:
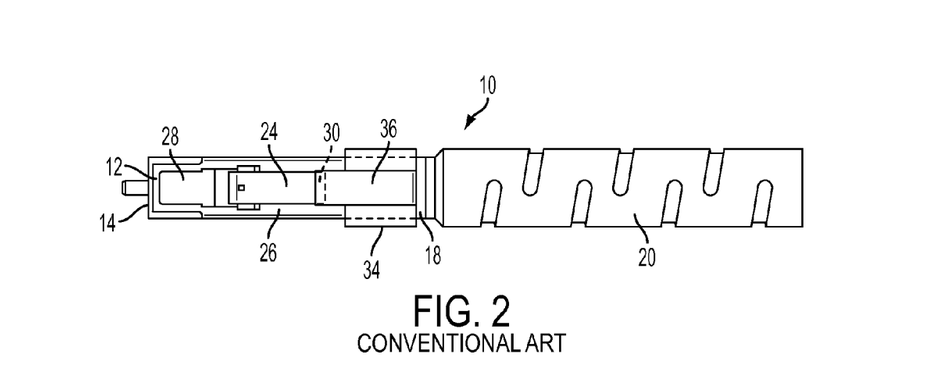
FIG. 2 is a top plan view of the LC connector of FIG. 1.

FIGS. 1 and 2 show a conventional LC connector 10 having a body 12 comprising a male connector configured to latchingly engage an opening in a complementary connector (not illustrated). The body 12 has a first end 14 insertable into the complementary connector in the direction of arrow 16, which direction may be referred to herein as the "latching direction," and the body 12 is removable from the complementary connector in a direction opposite the latching direction. The body also includes a second end 18 spaced from the first end and connected to a boot portion of an optical cable 20. The connector 10 has a longitudinal axis 22. An arm 24 projects from a first side 26 of the body 12 at an acute angle to the longitudinal axis 22 and has a connected end 28 connected to the body 12 and a distal end 30 spaced from the body 12. The arm 24 is flexible and resiliently connected to the body 12, and the distal end 30 moves between a first position, shown by solid lines in FIG. 1, where it is spaced from the longitudinal axis 22 by a first distance, and a second position, shown in broken lines in FIG. 1, where the distal end 30 is closer to the axis 22. When the distal end 30 is in the first position, conventional structures thereon engage structures in the complementary connector to latch the body 12 to the complementary connector. When the distal end 30 is depressed toward the first side 26 and into the second position, the latching structures on the connector 10 and the complementary connector delatch, and the connector 10 may then be removed from the complementary connector by applying a force in the direction opposite the latching direction 16. Such latching structures and the insertion and removal of LC connectors from complementary connectors are well known to those of ordinary skill in the art and will not be discussed further herein.

An antisnag member 32 is mounted on body 12 and comprises a sleeve portion 34 that frictionally engages body 12 and a flap 36 projecting from the sleeve portion 34 at an acute angle in the general direction of the body first end 14. The antisnag member 32 could alternately be integrally formed with the body 12. The flap 36 has a bottom 38, a top 40, a first end 42 connected to the sleeve portion 34 and a free end 44 overlying the distal end 30 of the arm 24 with the flap bottom 38 in contact with or in a closely spaced relationship with the distal end 30. When an LC connector without an antisnag member is pulled from a complementary connector in a direction opposite the latching direction 16, the angled arm 24 may catch or snag on nearby cables or components; the antisnag member 32 reduces the occurrences of such snags. In addition, the antisnag element 32 provides a mechanism for depressing the distal end 30 of the arm 24 toward the second, delatching position. By applying force against the top 40 of the flap 36, the bottom 38 of the flap 36 is pressed against the distal end 30 of the arm 24 and a user's fingers can thus squeeze the arm 24 toward the second position from further away than would be possible without the presence of the antisnag element 32.

Figure 3:
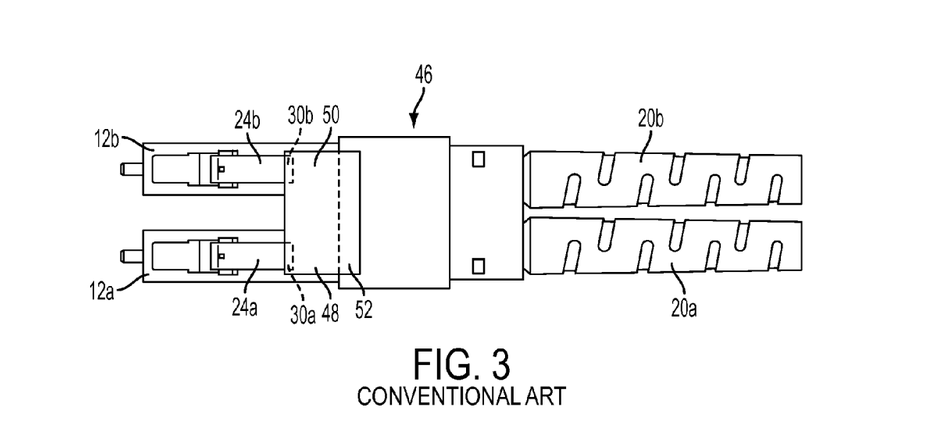
FIG. 3 is a top plan view of a conventional duplex LC connector having an antisnag flap.

FIG. 3 illustrates a conventional duplex LC connector 46 generally similar to the single LC connector 10 illustrated in FIGS. 1 and 2 which includes two of various elements that were present in the single LC connector. Where duplex connectors such as connector 46 are described, the elements common to single LC connectors will be labeled with the same reference numerals as in FIG. 1 and the letter "a" or "b." The LC connector 46 thus includes two bodies 12a and 12b, each having an arm 24a, 24b, etc. The duplex connector 46 also includes an antisnag element 48 comprising a flap 50 that is wide enough to overlay the distal ends 30a, 30b of the arms 24a, 24b of both LC connector bodies 12a, 12b. The antisnag element 48 thus substantially prevents either of the arms 24a, 24b from snagging when the LC connector 46 is moved in a delatching direction and also allows both of the arms 24a, 24b to be pressed toward their respective body portions 12a, 12b by pressing on a top surface 52 of the flap 50.

Figure 4:
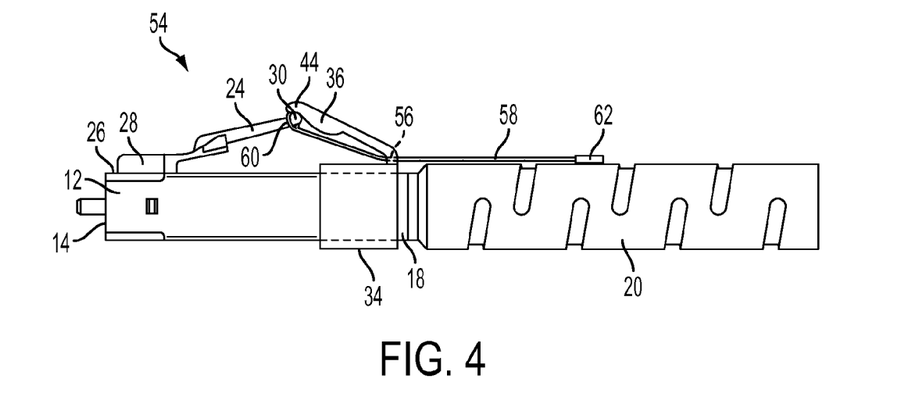
FIG. 4 is a side elevational view of an LC connector according to a first embodiment of the present invention.
Figure 5:
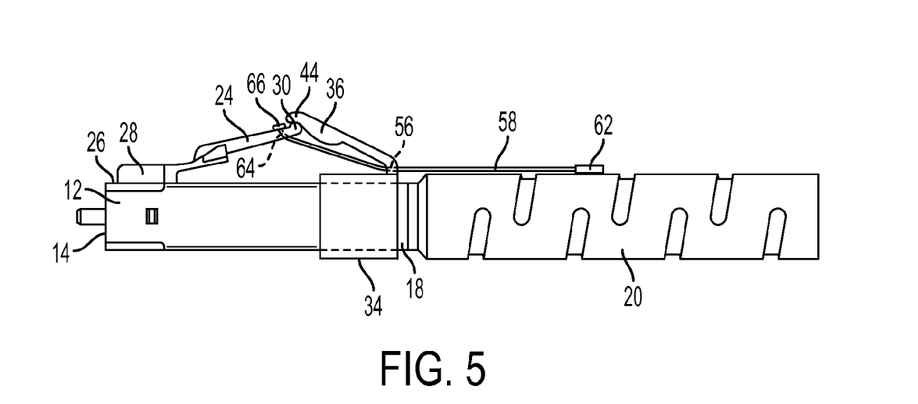
FIG. 5 is a side elevational view of a first variation of the LC connector of FIG. 4.

FIG. 4 illustrates an LC connector 54 according to an embodiment of the present invention, and elements common to the conventional LC connectors 10, 46 of FIGS. 1-3 will be identified with like reference numerals. The LC connector 54 includes a hole 56 through the flap 36 and a flexible or bendable extension member 58 having a first end 60 connected to the distal end 30 of arm 24. The extension member 58 passes through the hole 56 and extends over the boot portion of optical cable 20 and ends in a second, gripping, end 62. The first end 60 of the extension member 58 may encircle the distal end 30 of the arm 24 as illustrated in FIG. 4, or pass through a hole 64 in the distal end 30 of arm 24 as illustrated in FIG. 5 and be provided with an enlarged end portion 66 to secure the extension member 58 to the arm 24, or connected to the arm 24 in any other suitable manner. In the variation of FIG. 5, the width of the extension member 58 can be less than that of the arm 24 and thus not increase the width of the LC connector 54 in the region of the arm 24. A portion of the hole 56 forms a force redirection surface for the extension member 58 such that, when a force is applied to the extension member 58 in the direction opposite the latching direction 16, that force is redirected to pull the distal end 30 of the arm 24 toward the second position and delatch the connector 54 from the complementary connector element. In this manner, it is not necessary for a user to place fingers or a tool against arm 24 or to press directly against the antisnag flap 36, but rather, a pulling force at a distance from the arm 24 results in the delatching of the connector 54.

The extension member 58 may comprise a cord or string or bendable plastic filament, but preferably possesses sufficient rigidity so that the portion extending from hole 56 to the second end 62 is essentially self-supporting and does not droop significantly under its own weight or under the weight of cables extending from other nearby connectors. Preferably, the extension member 58 comprises a plastic strip having an essentially rectangular cross section that is sufficiently rigid to be self-supporting between the hole 56 and the second end 62 and sufficiently flexible to bend at the force redirection surface of hole 56 and transmit force to the distal end 30 of the arm 24 when the second end 62 of the extension member 58 is pulled in the direction opposite the latching direction.

Figure 6:
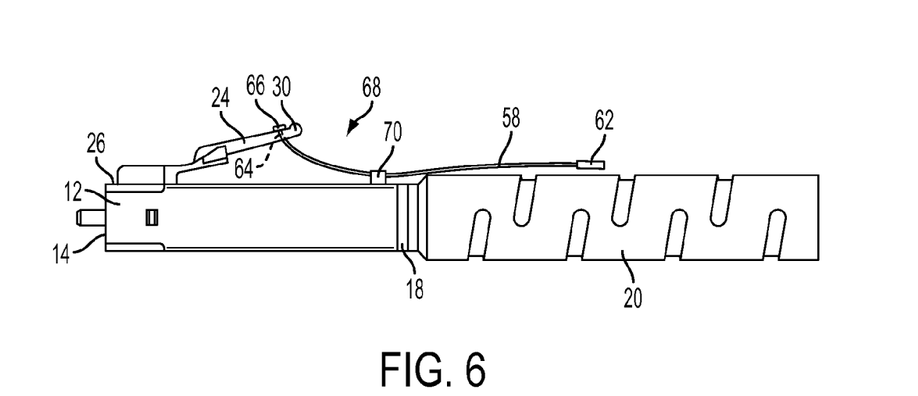
FIG. 6 is a side elevational view of a second variation of the LC connector of FIG. 4.

FIG. 6 illustrates an LC connector 68 that is a variation on the embodiment of the LC connector 54 of FIGS. 4 and 5. LC connector 68 does not include an antisnag element 32 but instead includes an inverted U-shaped member 70 defining an opening between the U-shaped member 70 and the first side 26 of the body 12 through which the flexible extension member 58 passes, the U-shaped member 70 providing the force redirection surface that was previously provided by the antisnag element 32. Other force redirection structures, such as a short tunnel (not illustrated) leading into and then out of the body 12 could be employed as force redirection surfaces within the scope of this disclosure. Like the hole 56 in the antisnag element 32, these force redirection structures would redirect a force in a direction opposite the latching direction 16 to pull the arm 24 toward the side 26 of the body 12 and toward the second, delatching, position.

The inverted U-shaped member 70 may be integrally formed with the first side 26 of the body 12 during a molding process. Also, the extension member 58 may optionally be integrally formed with the arm 24 during the molding process. The extension member 58 would not be initially formed as passing through the U-shaped member 70, but rather would be formed as a thin, flat whip extending off of the arm 24 with sufficient flexibility, such that a technician could thread the extension member 58 through the U-shaped member 70.

Figure 7:
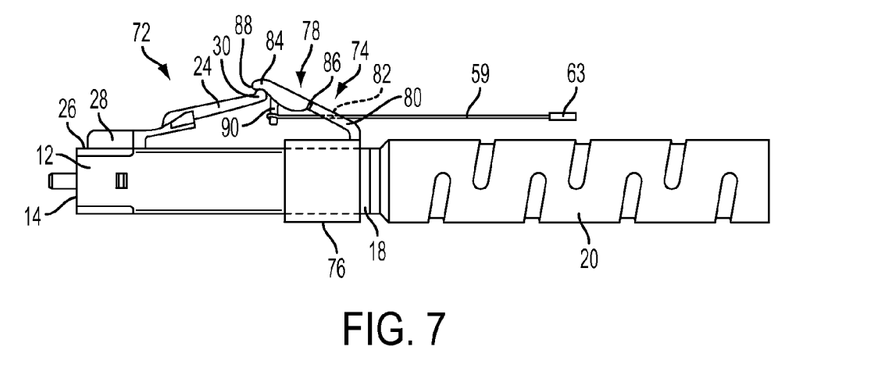
FIG. 7 is a side elevational view of an LC connector according to a second embodiment of the present invention.

FIG. 7 illustrates an LC connector 72 according to a second embodiment of the present invention and in which elements common to earlier embodiments and conventional LC connectors are identified with like reference numerals. The LC connector 72 includes an antisnag element 74 having a sleeve 76 that substantially surrounds the body 12 of the LC connector 72 and a flap 78. The flap 78 comprises a first portion 80 that attaches to the sleeve 76 and that includes a hole 82 and a second portion 84 hingedly connected to the first portion 80 by a hinge 86. The hinge 86 may be a groove or a thinned portion of the flap 78 that causes the flap 78 to bend preferentially at the hinge 86 when a bending force is applied. The second portion 84 of the flap 78 overlies the distal end 30 of the arm 24 and includes a bottom surface 88 that engages the distal end 30. A projecting member 90 projects from and is flexibly attached to the bottom surface 88 and provides an attachment point for a rigid extension member 59 and constitutes a force redirection mechanism for this embodiment. When a force is applied to pull the second end 63 of the rigid extension member 59 in the direction opposite the latching direction, the force draws the projecting member 90 toward the first portion 80 of the flap 78 and flexes the second portion 84 of the flap 78 toward the first side 26 and presses the distal end 30 of the arm 24 toward the first side 26 and into the second position. This embodiment thus avoids the need to connect an extension member directly to the arm 24 instead applying a force to the antisnag element 74 to shift the position of the arm 24 by moving the antisnag element 74. Depending on the flexibility of the material used to form the antisnag element 74, it may be desirable to move the location of the hinge 86 closer to the free end of the flap 78 than what is illustrated in FIG. 7.

Figure 8:
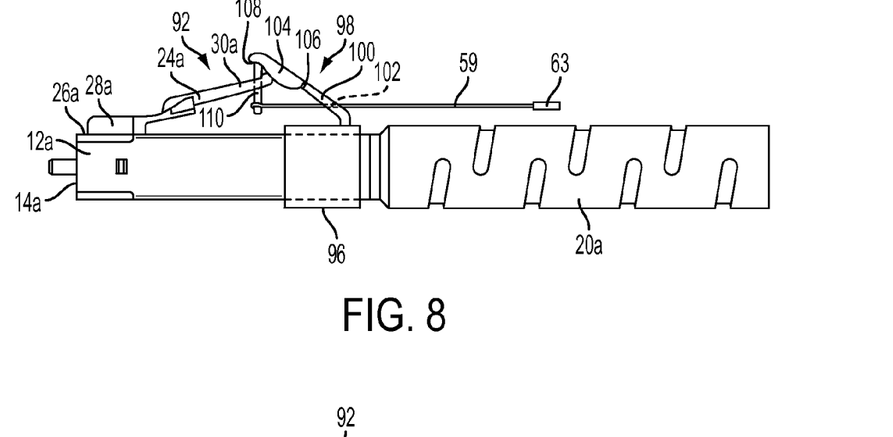
FIG. 8 is a side elevational view of a duplex LC connector according to a third embodiment of the present invention.
Figure 9:
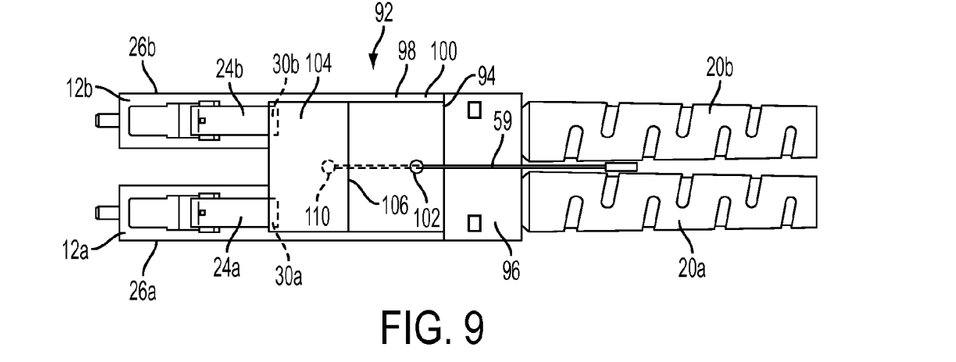
FIG. 9 is a top plan view of the duplex LC connector of FIG. 8.

FIGS. 8 and 9 show a variation of the embodiment of FIG. 7 used on a duplex LC connector 92. The connector 92 includes first and second body portions 12a and 12b, each having a respective arm 24a, 24b, and an antisnag element 94 comprising a sleeve 96 and a flap 98. The flap 98 has a first portion 100 that attaches to the sleeve 96 and that has a hole 102 and a second portion 104 hingedly connected to the first portion 100 by a hinge 106. The second portion 104 of the flap 98 overlies the distal ends 30a, 30b of the arms 24a, 24b and includes a bottom surface 108 that engages the distal ends 30a and 30b. A projecting member 110 projects from and is flexibly attached to the bottom surface 108, provides an attachment point for extension member 59 and constitutes a force redirection mechanism for this embodiment. The projecting member 110 may be located generally between the distal ends 30a, 30b of the arms 24a, 24b, centrally disposed on the flap 98 so that a force applied to the extension member 59 and projecting member 110 is applied substantially equally against the arms 24a, 24b to release both connector body portions 12a, 12b at the same time.

The projecting member 110 may be integrally formed with the bottom surface 108 of the second portion 104 of the flap 98 during a molding process. Also, the extension member 59 may optionally be integrally formed with the projecting member 110 during the molding process. The extension member 59 would not be initially formed as passing through the hole 102, but rather would be formed as a thin, flat whip extending off to the side of the projecting member 110 with sufficient flexibility, such that a technician could thread the extension member 59 through the hole 102, before or after the sleeve 96 is clipped onto the first and second body portions 12a and 12b.

Figure 10:
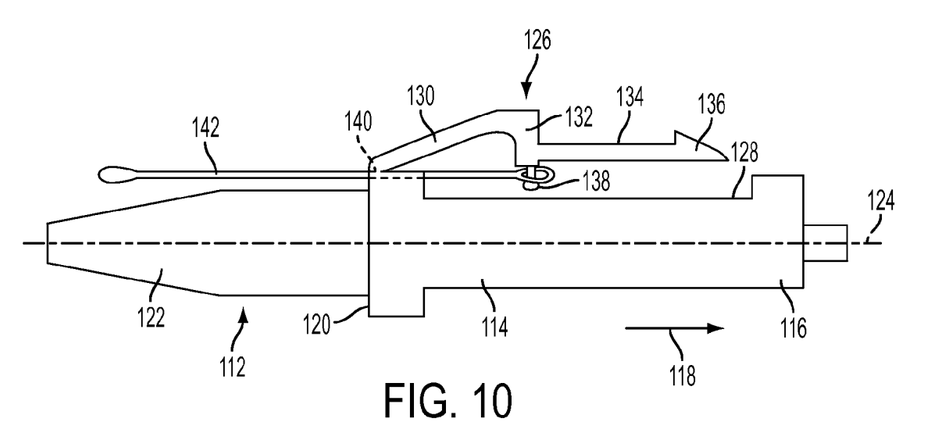
FIG. 10 is a side elevational view of an MTRJ connector according to a fourth embodiment of the present invention.

FIG. 10 illustrates a different type of connector 112, an MTRJ connector, that can be remotely actuated by an extension member in a manner related to that of the foregoing embodiments. The connector 112 includes a body 114 comprising a male connector configured to latchingly engage an opening in a complementary connector (not illustrated). The body 114 has a first end 116 insertable into the complementary connector in the direction of arrow 118, which direction may be referred to herein as the "latching direction," and the body 114 is removable from the complementary connector in a direction opposite the latching direction. The body also includes a second end 120 spaced from the first end and connected to a boot portion of an optical cable 122. The connector 112 has a longitudinal axis 124. An arm 126 projects from a first side 128 of the body 114 at the second end 120 and comprises an angled portion 130 directed away from the longitudinal axis 124 at an acute angle, a generally vertical depending wall 132 directed toward the longitudinal axis 124 and an axially aligned portion 134 extending toward the first end 116 parallel to longitudinal axis 124 and ending in a barb 136. The barb 136 engages a corresponding structure (not illustrated) in a complementary female connector to hold the connector 112 in place. The connector 112 can be released from the complementary connector by pressing the angled portion 130 toward the longitudinal axis 124 to move the barb 136 closer to the longitudinal axis 124 and out of the corresponding structure in the complementary connector that holds the connector 112 in place.

The connector 112 as described thus far is essentially conventional. However, the connector 112 also includes a projection 138 comprising a force redirecting member near the junction of the depending wall 132 and the axially aligned portion 134. The projection 138 depends from the arm 126 and projects toward the longitudinal axis 124 but is spaced from the first side 128. A hole 140 is provided in the angled portion 130, and an extension member 142 connected to the projection 138 extends through the hole 140 and over the boot portion of the optical cable 122. Pulling on the extension member 142 in the direction opposite the latching direction applies a force to the projection 138 which bends the arm 126 about the junction between the arm 126 and the body 114 and moves the barb 136 toward the longitudinal axis 124 in order to release the connector. The extension member 142 is preferably sufficiently rigid so that the portion of the extension member 142 extending from the hole 140 over the boot portion of the optical cable 122 is self supporting.

Figure 11:
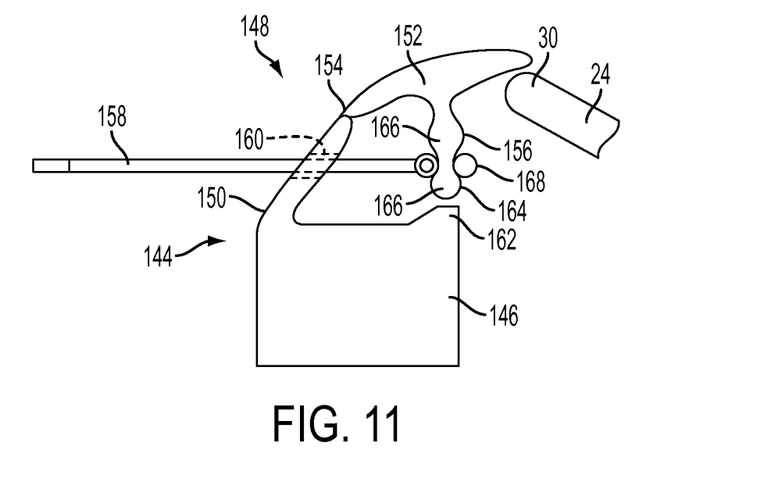
FIG. 11 is a side elevational view of a modification to an antisnag flap usable with the second and third embodiments showing the antisnag flap in a first position.
Figure 12:
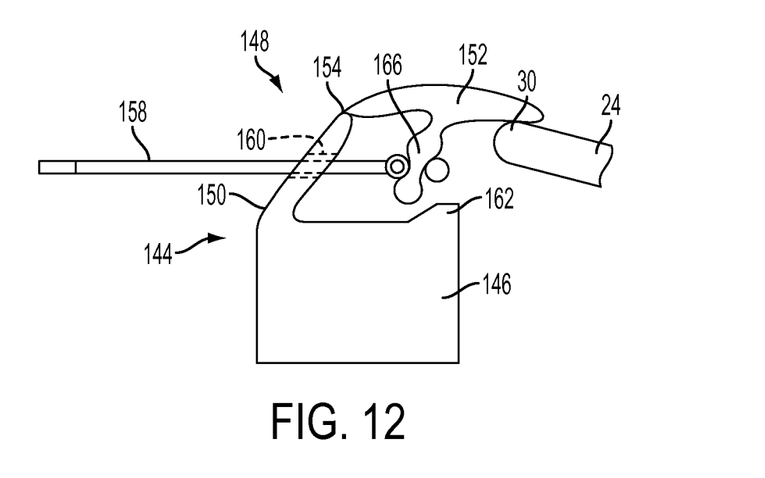
FIG. 12 is a side elevational view of the antisnag flap of FIG. 11 in a second position.

FIGS. 11 and 12 illustrate a modified antisnag arrangement that can be used with single or duplex LC connectors. The antisnag arrangement comprises an antisnag element 144 having a sleeve 146 for engaging the body of an LC connector (not illustrated) and a flap 148 with a first portion 150 connected to the sleeve and a second portion 152 extending from the first portion and connected to the first portion by a hinge 154 and extending over the distal end 30 of an arm 24 of the LC connector. A projection 156 depends from the second portion 152 toward the sleeve 146, and an extension member 158 is connected to the projection 156 and extends through a hole 160 in the first portion 150. As with the embodiment illustrated in FIGS. 7-9, pulling on the extension member 158 flexes the projection 156, bends the flap 148 at the hinge 154 and causes the second portion 152 of the flap 148 to press against the distal end 30 of the arm 24 of the LC connector (not illustrated) to release the LC connector from a complementary connector. In the present embodiment, the length of the projection 156 and/or the dimensions of the sleeve 146 are selected such that the second portion 152 of the flap 148 cannot be bent toward the sleeve 146 while the projection 156 is directed toward the sleeve 146. Instead, the projection 156 must be flexed to an angled position, illustrated in FIG. 12, to allow the second portion 152 of the flap 148 to move toward the sleeve 146 and press against the distal end 30 of the arm 24. A suitable relationship between the projection 156 and the sleeve 146 may be obtained by providing a ridge or raised area 162 on the sleeve 146 immediately below the end of the projection 156 to prevent movement of the second portion 152 of the flap 148. Alternately, the diameter of the sleeve 146 may be substantially constant and a groove (not illustrated) may be provided near the free end of the projection 156 to accommodate the projection 156 as it is pulled toward the first portion 150 of the flap 148. This kickstand-like feature substantially prevents the accidental depression of the antisnag flap 148; downward pressure on the second portion 152 of the flap 148 will not release the LC connector when the projection 156 is directed toward the sleeve 146. Instead, the extension member 158 must be pulled in order to bend the projection 156 to a position where it does not interfere with the movement of the second portion 152 of the flap 148 toward the sleeve 146.

Figure 13:
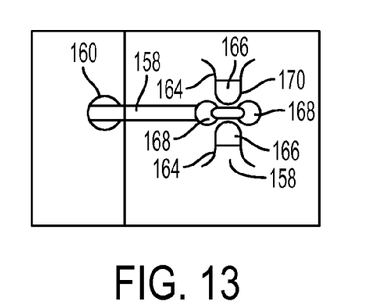
FIG. 13 is a bottom plan view of the antisnag flap of FIG. 11.

FIGS. 11 and 12, together with FIG. 13 illustrate one mechanism for attaching the extension member 158 to the projection 156. The projection 156 may terminate in a pair of spaced apart arms 164 forming an inverted "Y," each arm of the Y terminating in a rounded knob 166. The extension member 158, in turn, may comprise a first end having first and second rounded portions 168 separated by a small gap 170. The small gap 170 may be inserted between the arms 164 of the Y to provide a snap fit or friction fit between the extension member 158 and the arms 164 which will securely but releasably connect the extension member 158 to the projection 156 while allowing the connection to flex when the projection is pulled by the extension member 158.

Figure 14:
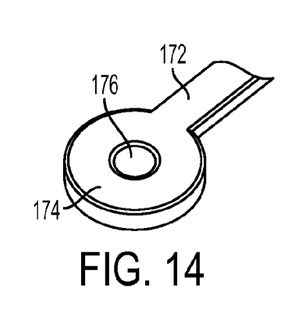
FIG. 14 is a perspective view of a first arrangement for an end of an extension member usable with the foregoing embodiments.
Figure 15:
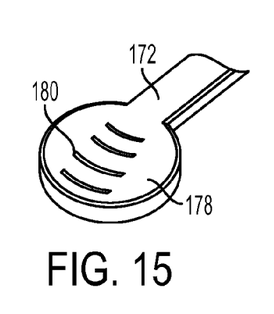
FIG. 15 is a perspective view of a second arrangement for an end of an extension member usable with the foregoing embodiments.
Figure 16:
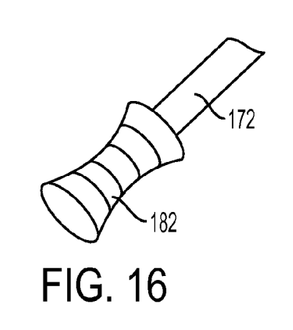
FIG. 16 is a perspective view of a third arrangement for an end of an extension member usable with the foregoing embodiments.

FIGS. 14-16 illustrate possible configurations for a second end of any of the extension members heretofore described. FIG. 14 shows that an extension member 172 may terminate in a flattened, rounded portion 174 with a central opening 176; FIG. 15 shows that the extension member 172 may terminate in a flattened rounded portion 178 with no opening but including grip-enhancing ridges 180; FIG. 16 shows that the extension member 172 may terminate in a tapered cylindrical structure 182. The extension member 172 could likewise terminate in any other suitable structure that is small enough to fit into the space available given the arrangement of connectors and that has a surface that can be easily gripped in a substantially nonslip manner by a user's fingers.

The present invention has been described herein in terms of several preferred embodiments. It will be understood that various modifications and additions to these embodiments will become apparent to those of ordinary skill in the art upon a reading of the foregoing description. It is intended that all such modifications and additions comprise a part of the present invention to the extent they fall within the scope of the several claims appended hereto.

What is claimed is:

1. A duplex connector comprising:
a first body configured to latchingly connect to a first complementary connector element in a latching direction, said first body including a first end for engaging the first complementary connector element, a second end and a longitudinal axis;
a first arm projecting from said first body at an angle to said axis, said first arm having a connected end at said first body and a distal end spaced from said first body, said first arm configured to shift from a first position with said distal end a first distance from said axis to a second position with said distal end a second distance from said axis, said second distance being less than said first distance, said first body being removable from said first complementary connector element when said first arm is in said second position;
a second body configured to latchingly connect to a second complementary connector element in a latching direction, said second body including a first end for engaging the first complementary connector element, a second end and a longitudinal axis;
a second arm projecting from said second body at an angle to said axis, said second arm having a connected end at said second body and a distal end spaced from said second body, said second arm configured to shift from a first position with said distal end a first distance from said axis to a second position with said distal end a second distance from said axis, said second distance being less than said first distance, said second body being removable from said second complementary connector element when said second arm is in said second position;
a sleeve attached to said first and second bodies;
a flap having a first end connected to said sleeve and a free end overlying said distal ends of said first and second arms; and
an extension member connected to said flap and extending in a direction opposite the latching directions of said first and second bodies.

2. The connector of claim 1, wherein said extension member is bendable.

3. The connector of claim 1, wherein said extension member has a free end having a grip element.

4. The connector of claim 1, wherein said first and second bodies form first and second LC type connectors.

5. The connector of claim 1, wherein said flap comprises a projecting member projecting toward an area generally between said distal ends of said first and second arms, and wherein said extension member is connected to said projecting member.

6. The connector of claim 5, wherein said flap includes a hinge dividing said flap into a first section connected to said sleeve and a second section contacting said distal ends of said first and second arms, wherein said projecting member is attached to said second section.

7. The connector of claim 5, wherein said first section of said flap includes a hole and wherein said extension member passes through said hole.

8. The connector of claim 5, wherein said extension member is coupled to said projecting member by a snap fit.

9. The connector of claim 5, wherein said extension member is integrally formed with said projecting member.

10. The connector of claim 9, wherein said extension member is bendable.

11. The connector of claim 10, wherein said first section of said flap includes a hole and wherein said extension member is bent and then passed through said hole in said second section of said flap.

12. A connector comprising:
a body configured to latchingly connect to a complementary connector element in a latching direction, the body including a first end for engaging the complementary connector element, a second end and a longitudinal axis;
an arm projecting from said body at an angle to said axis, said arm having a connected end at said body and a distal end spaced from said surface, said arm configured to shift from a first position with said distal end a first distance from said axis to a second position with said distal end a second distance from said axis, said second distance being less than said first distance, said body being removable from said complementary connector element when said arm is in said second position;
a force redirection element connected to said body at a fixed location between the first and second ends; and
an extension member in contact with said force redirection element;
wherein, a force applied to said extension member in a direction opposite the latching direction is redirected by said force redirection element to shift said arm from the first position toward the second position, wherein said arm is resiliently connected to said body, and wherein said body forms a plug of the LC type or RJ type.

13. The connector of claim 12, including a flap having a first end connected to said body at a location spaced from said distal end in the direction opposite the latching direction and a free end overlying said arm distal end and a through opening having a surface, wherein said force redirection element comprises said flap.

14. The connector of claim 13, wherein said extension member is connected to said arm and extends through said flap.

15. The connector of claim 14, wherein said extension member is bendable.

16. The connector of claim 13, wherein said force redirection element comprises said surface of said through opening.

17. The connector of claim 12, including a flap having a first end connected to said body at a location spaced from said distal end in the direction opposite the latching direction and a free end overlying said arm distal end, wherein said force redirection element comprises a projection projecting from said flap and said extension member is connected to said projection.

18. The connector of claim 17, wherein said projection projects from a surface of said flap toward said body and has a distal end and wherein said extension member is connected to said projection at said projection distal end.

19. The connector of claim 18, wherein said flap comprises a hinge perpendicular to said axis and spaced from said body.

20. The connector of claim 19, wherein said extension member is rigid.

* * * * *